United States Patent [19]
Covert et al.

[11] Patent Number: 5,361,814
[45] Date of Patent: Nov. 8, 1994

[54] ASYMMETRIC TIRE

[75] Inventors: Darrell E. Covert, Uniontown; Paul B. Maxwell, Akron; Frederick W. Miller, Akron; Richard L. Galante, Akron; Michael A. Kolowski, Mogadore; William M. Hopkins, Hudson; Anthony J. Scarpitti, Uniontown, all of Ohio

[73] Assignee: The Goodyear Tire & Rubber Company, Akron, Ohio

[21] Appl. No.: 436,580

[22] Filed: Nov. 15, 1989

[51] Int. Cl.$^5$ .................. B60C 11/01; B60C 11/04
[52] U.S. Cl. ............................ 152/209 A; 152/209 R
[58] Field of Search .......... 152/209 A, 209 R, 209 D, 152/DIG. 3, 455

[56] References Cited

U.S. PATENT DOCUMENTS

| | | | |
|---|---|---|---|
| D. 261,495 | 10/1981 | Yurkovich . | |
| D. 269,336 | 6/1983 | Yurkovich . | |
| D. 296,093 | 6/1988 | Messanotte | D12/146 |
| 2,534,869 | 12/1950 | Jones | 152/209 A |
| 3,155,135 | 11/1964 | Klenk | 152/209 R |
| 3,162,229 | 12/1964 | Ellenseider et al. | 152/209 A |
| 3,286,756 | 11/1966 | Ellenseider et al. | 152/209 A |
| 3,405,753 | 10/1968 | Verdier | 152/209 R |
| 3,705,613 | 12/1972 | Verdier | 152/209 R |
| 3,847,698 | 11/1974 | Rauenhall | 152/209 R |
| 3,858,633 | 1/1975 | Boileau | 152/209 R |
| 3,861,436 | 1/1975 | Pogue | 152/209 R |
| 3,881,492 | 5/1975 | Mirtain | 152/455 |
| 4,217,942 | 8/1980 | Takigawa | 152/209 R |
| 4,429,728 | 2/1984 | Ippen | 152/209 A |
| 4,635,694 | 1/1987 | Hosokawa | 152/209 A |
| 4,732,194 | 3/1988 | Saneto et al. | 152/209 R |
| 4,758,863 | 11/1988 | Tsuda et al. | 152/209 A |
| 4,848,429 | 7/1989 | Mezzanotte | 152/209 A |

FOREIGN PATENT DOCUMENTS

| | | | |
|---|---|---|---|
| 0338491 | 10/1989 | European Pat. Off. . | |
| 2263455 | 7/1974 | Germany . | |
| 67404 | 3/1989 | Japan | 152/209 A |

OTHER PUBLICATIONS

Advertisement for Pirelli P500, Tire Review, Sep. 1989.
"Focus on Europe, The Stuart Marshall Report, Aladdins Cave in Tokyo", Modern Tire Dealer, Feb. 1988, p. 46.

*Primary Examiner*—Geoffrey L. Knable
*Attorney, Agent, or Firm*—David L. King

[57] ABSTRACT

A radial ply pneumatic tire (30) has as asymmetric tread portion (41) having circumferential grooves (50, 51, 52, 53) and diagonal grooves (55, 56) therein. The tread is divided into three axial regions (A, B, C) of equal width, and in each region the net-to-gross ratio is different. The rate of treadwear in the axially outermost regions (A, B) of the tread are substantially equalized by features including varying groove depths and widths, groove paths, and chamfering the edges of block elements (57, 58, 62, 63) of the tread.

8 Claims, 11 Drawing Sheets

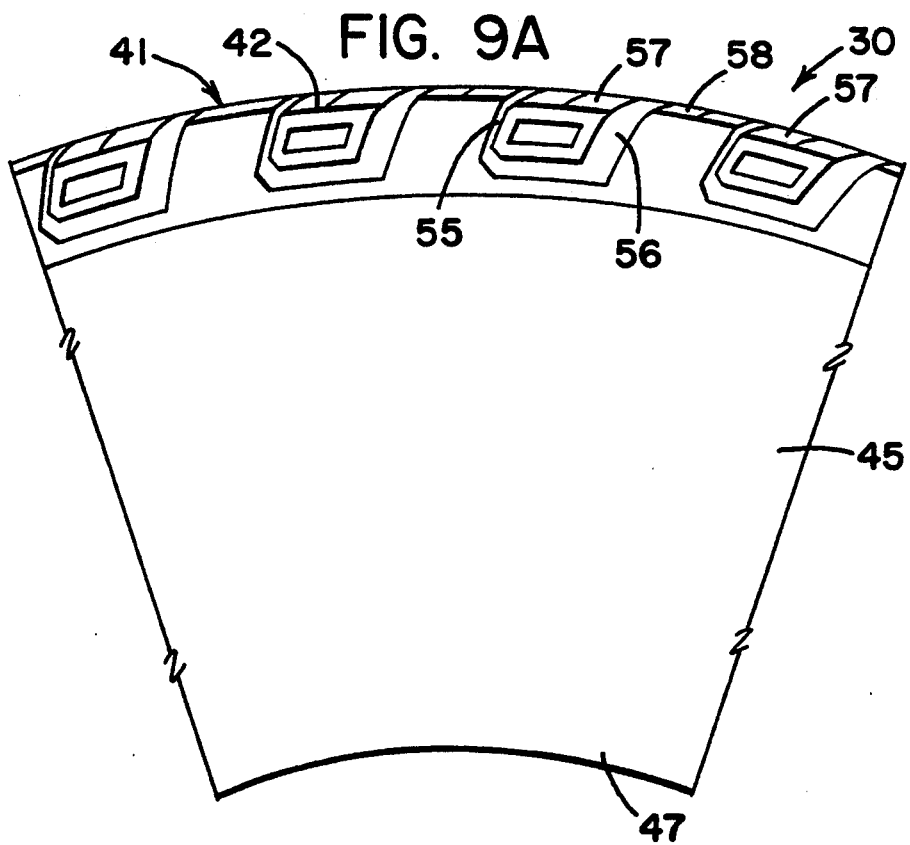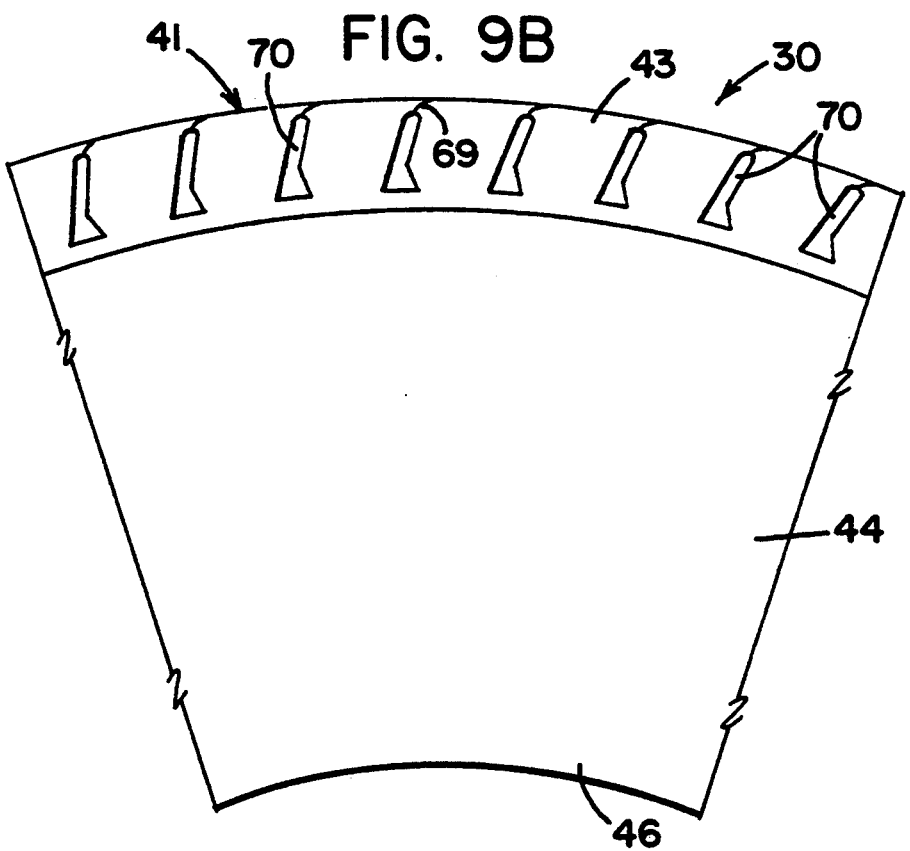

ASYMMETRIC TIRE

The present invention relates generally to pneumatic tires and more specifically to a pneumatic tires which is asymmetrical with respect to its equatorial plane.

An understanding of the invention can be gained by a consideration of the following detailed description of several preferred embodiments in conjunction with the attached drawings, wherein.

Figure 5:
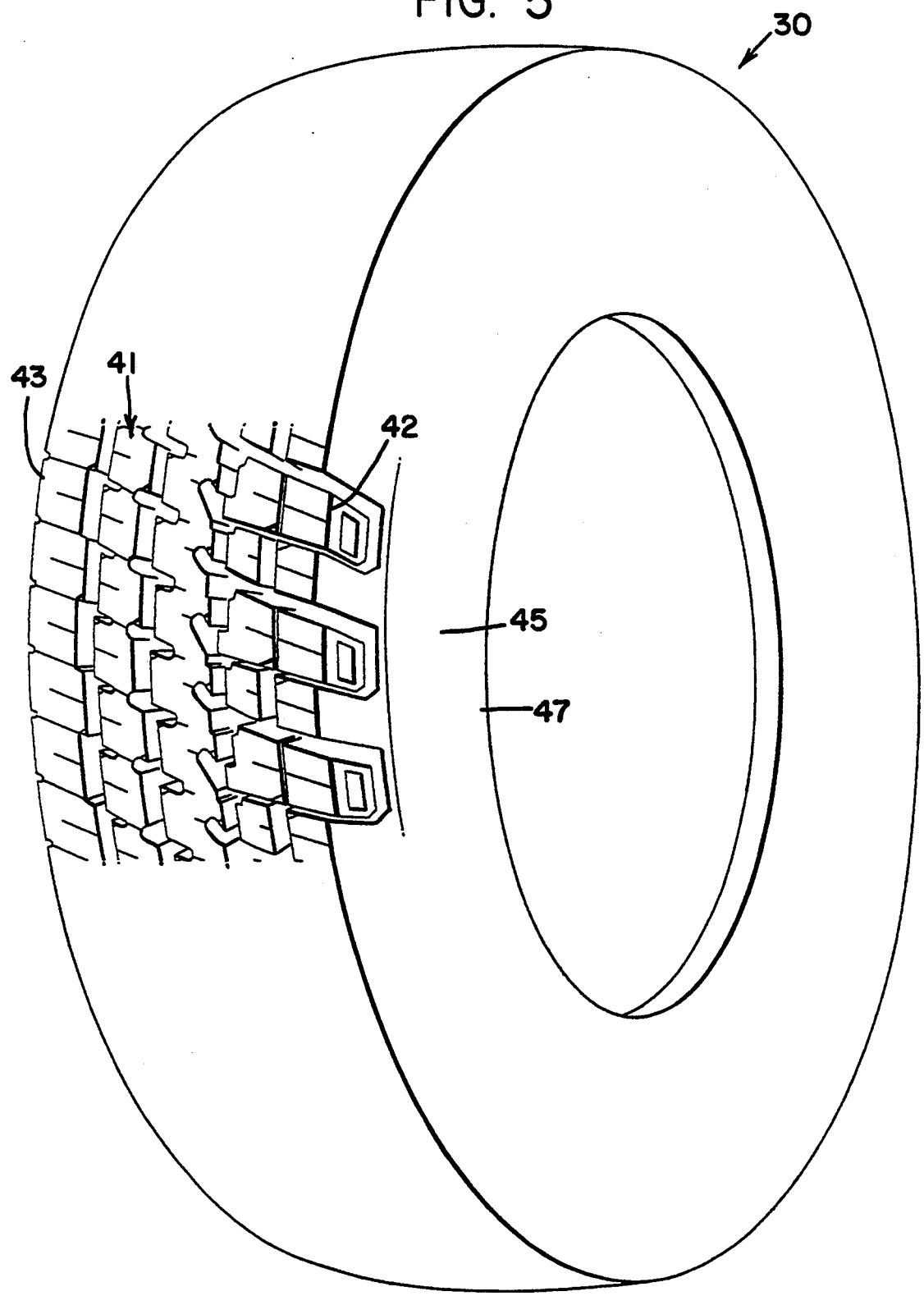
FIG. 5 is a perspective view of a tire according to the invention with only a portion of the tread shown.
Figure 6:
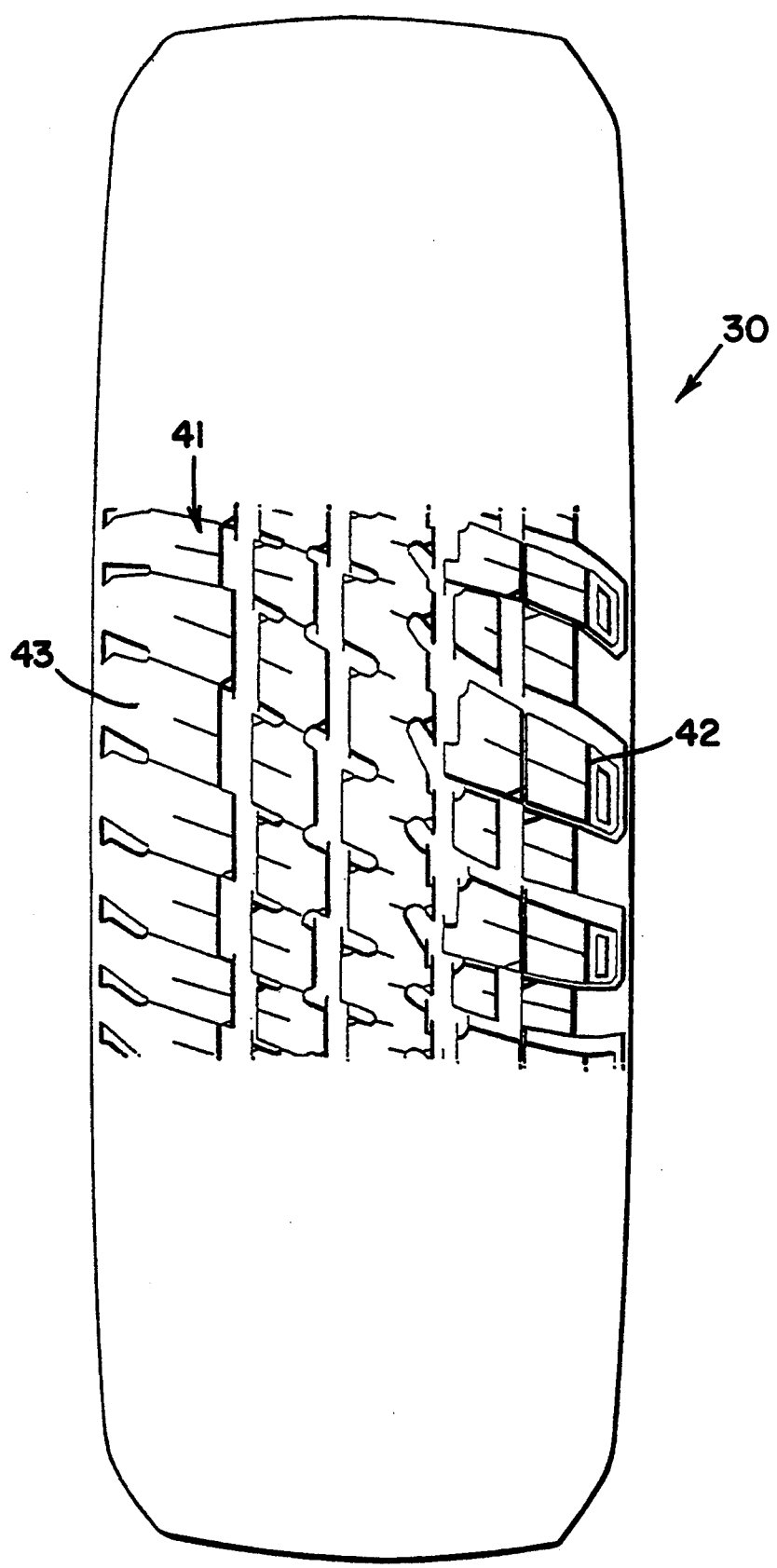
FIG. 6 is a front elevation view of a tire according to the invention with only a portion of the tread shown.
Figure 7:
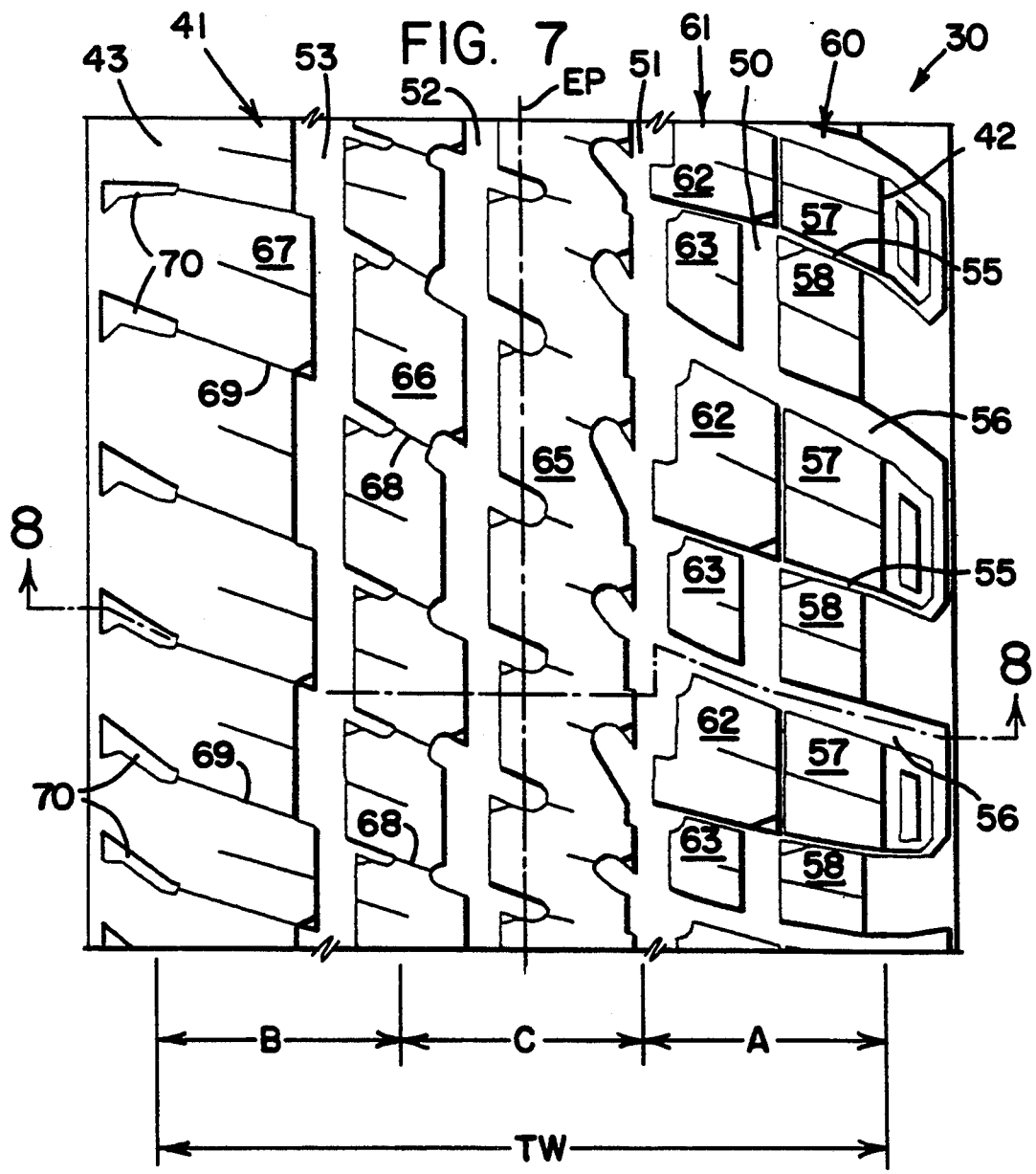
Figure 8:
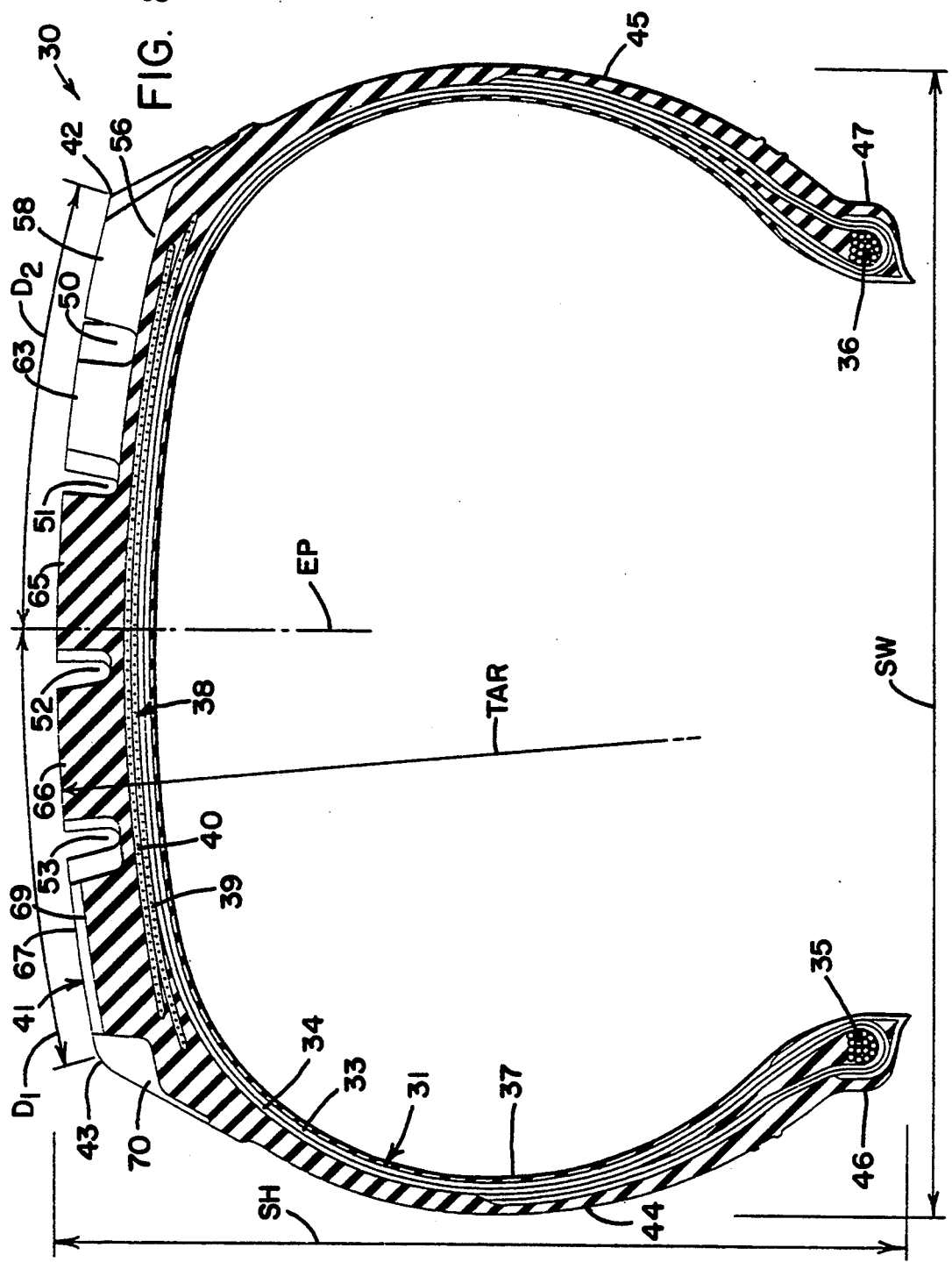

FIG. 7. is an enlarged fragmentary front elevation view of the tread portion of the embodiment shown in FIGS. 5 and 6;

FIG. 8 is a cross-sectional view of a tire according to the embodiment shown in FIGS. 5 and 6 taken along lines 8—8 of FIG. 7;

FIGS. 9A and 9B are fragmentary side elevation views of the embodiment shown in FIGS. 5 and 6.

Figure 10:
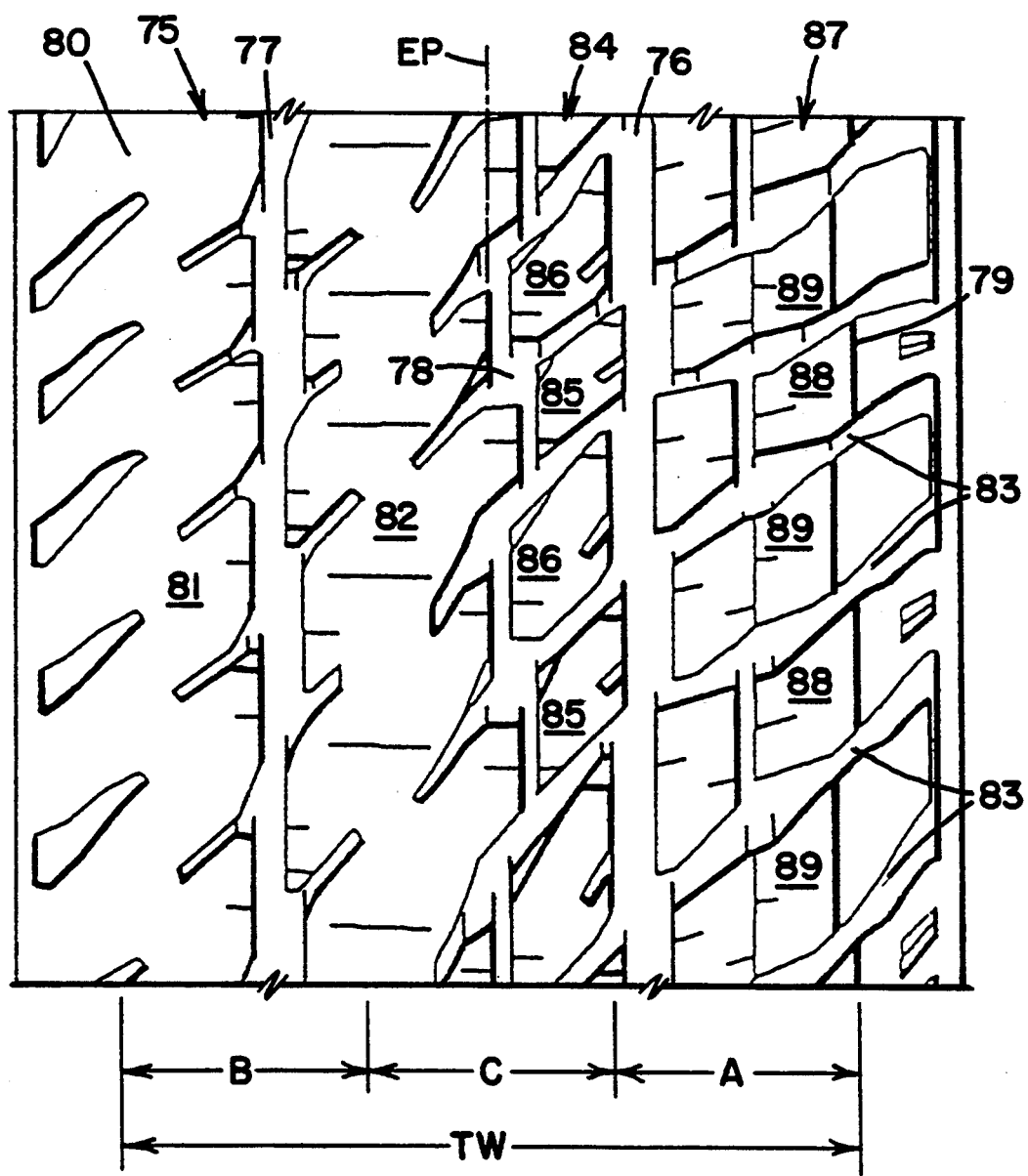
Figure 11:
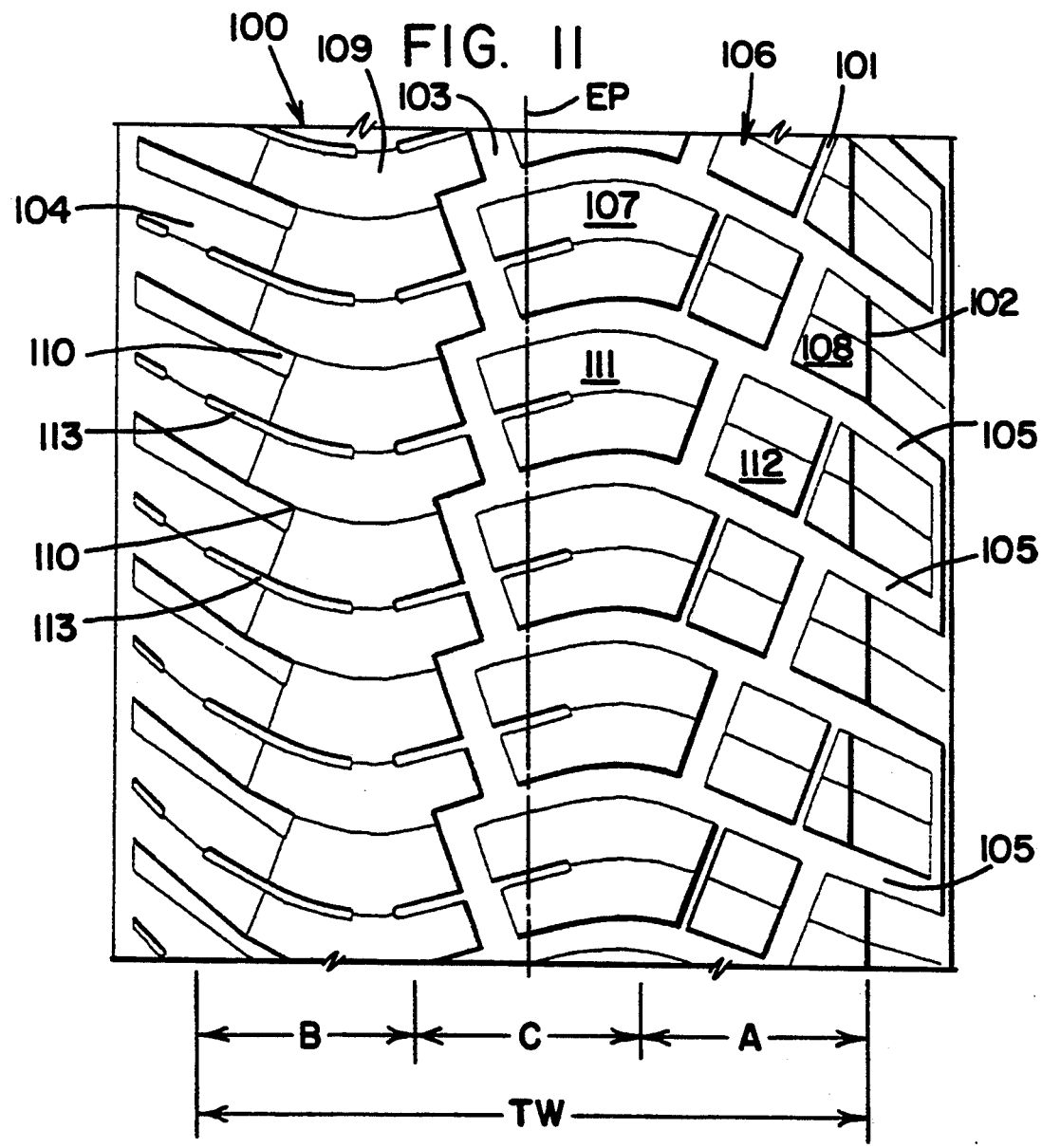
Figure 12:
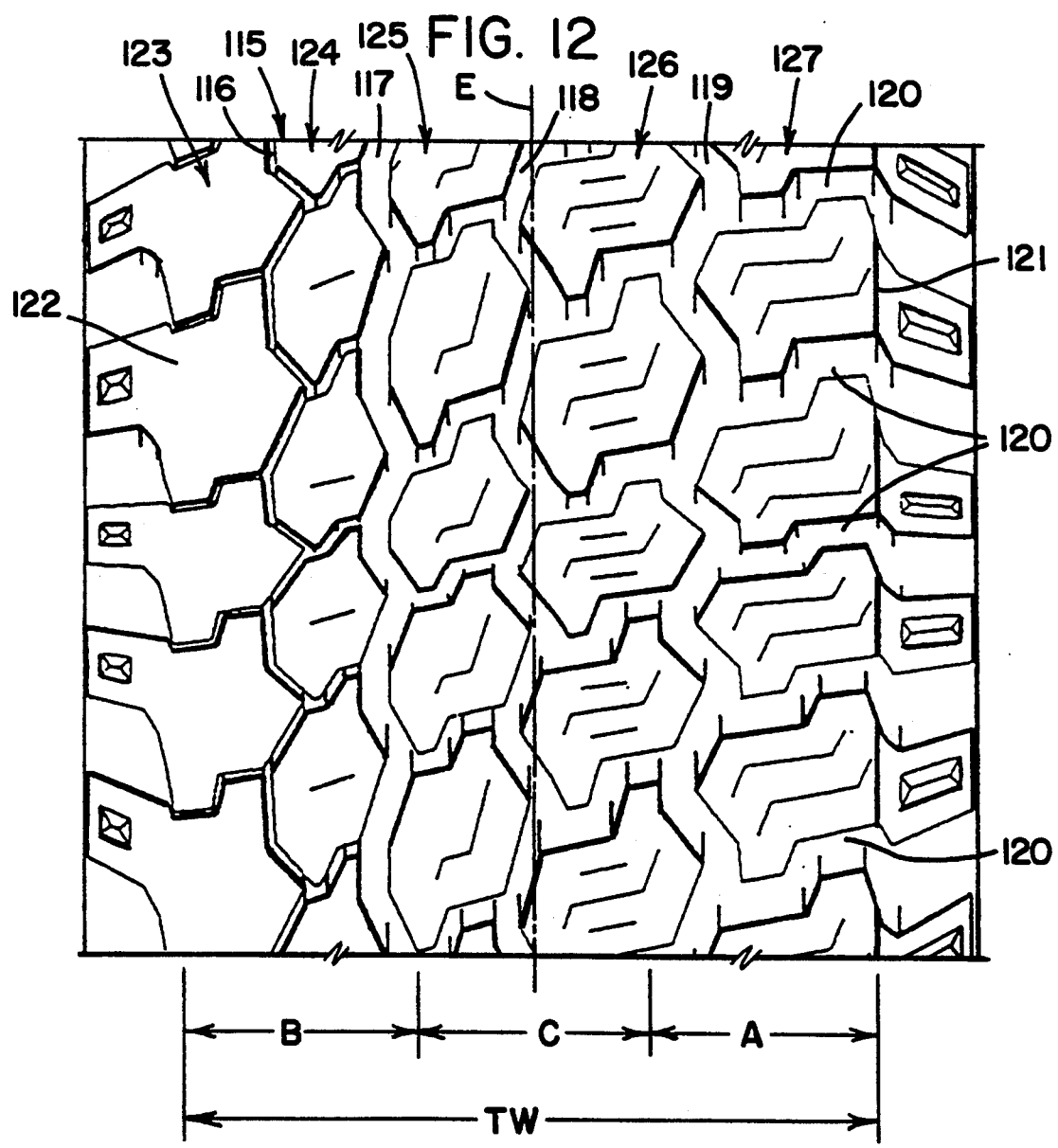

FIG. 10 is an enlarged fragmentary front elevation view of the tread portion of a tire according to another embodiment;

FIG. 11. is an enlarged fragmentary front elevation view of the tread portion of a tire according to another embodiment;

FIG. 12 is an enlarged fragmentary front elevation view of the tread portion of a tire according to the most preferred embodiment.

A tire as a mechanical structure can be described in general terms as a nonrigid torus composed of a flexible carcass of high-tensile cords fastened to substantially inextensible annular beads that firmly anchor the tire to the rim. The internal inflation pressure stresses the tire in such a way that any external force causing deformation in the carcass results in a tire reaction force. For example, as greater load is applied to a tire the deflection and ground contact area increase until a portion of the tire sufficient to support the load is affected.

Figure 1:
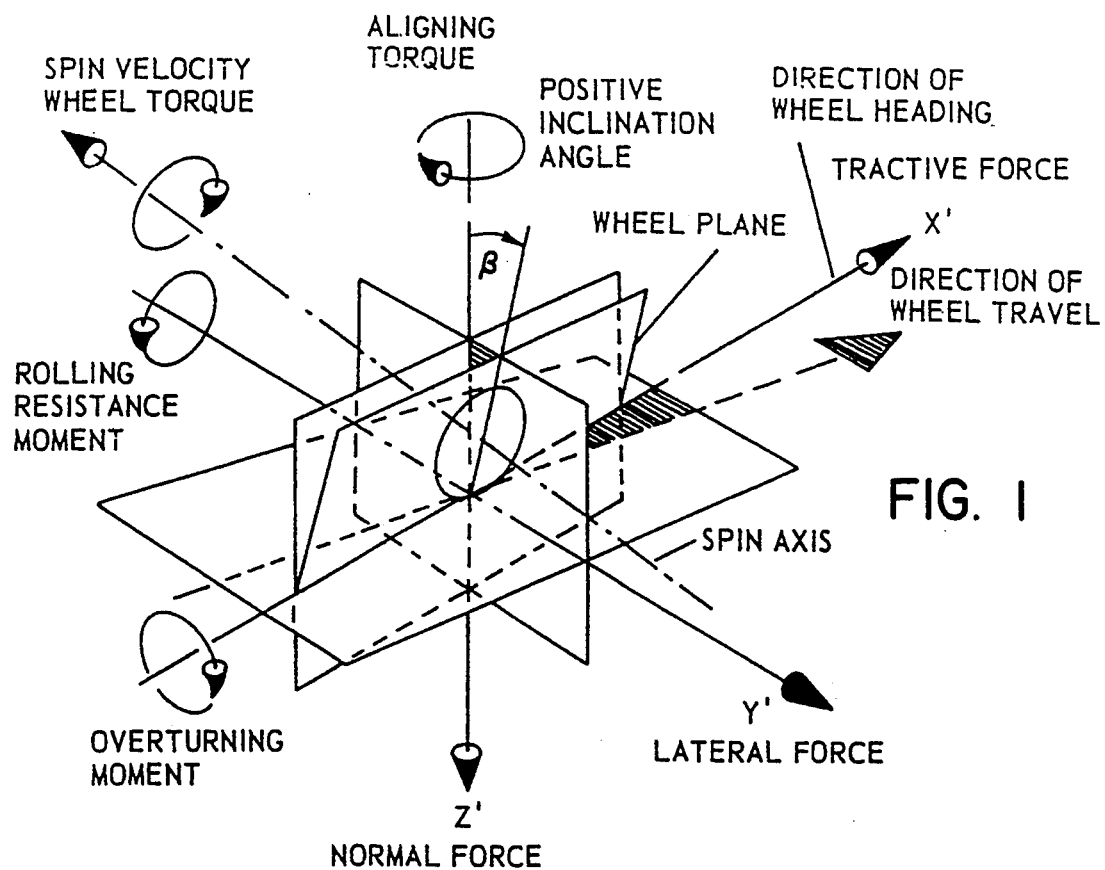
FIG. 1 is a schematic diagram indicating the forces which act upon a tire when it is mounted upon a moving vehicle.

The tire-axis system shown in FIG. 1 relates the forces acting on a tire by six quantities; three forces and three moments. The origin of this tire-axis system is the tire-road interface.

Of course, for tires mounted on opposite sides of a vehicle some of these forces, such as the lateral force ($Y^1$) are in opposite directions to those indicated in FIG. 1. To further complicate the system of forces acting on a tire vehicle manufacturers are widely using suspension systems which unlike solid axles allow the positive inclination angle ($\beta$) of a tire with respect to the ground to vary constantly on each side of the vehicle.

Figure 2:
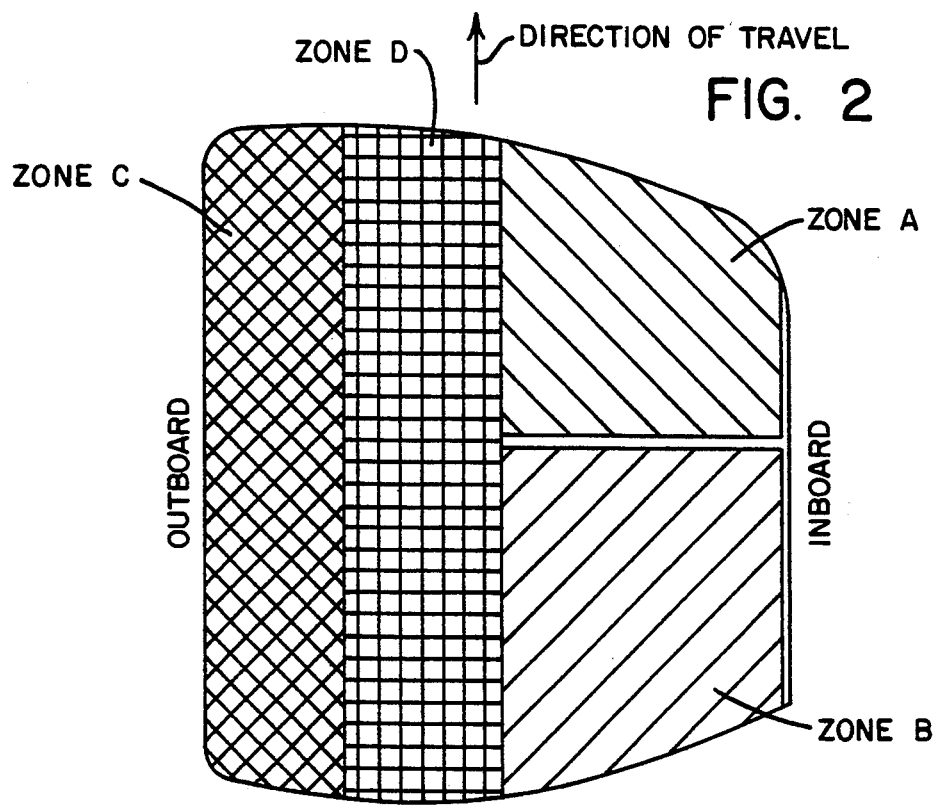
FIG. 2 is a schematic representation of a footprint of a tire showing the zones of the footprint in which various functions of the tire predominate.

Referring next to FIG. 2 there is shown a schematic representation of a footprint of a tire mounted on the left front position of a vehicle, with the zones in which various functions of the tire are predominant indicated. In Zone A of the footprint the predominant function is breaking deceleration, while in Zone B the predominant function is forward acceleration. In Zone C the predominant function is cornering power while in Zone D the predominant function is steering precision when a vehicle is following a straight path. It can be observed from FIG. 2 that a tire functions differently not only laterally across the footprint, but also differently from front to rear of the footprint.

Figure 3A:
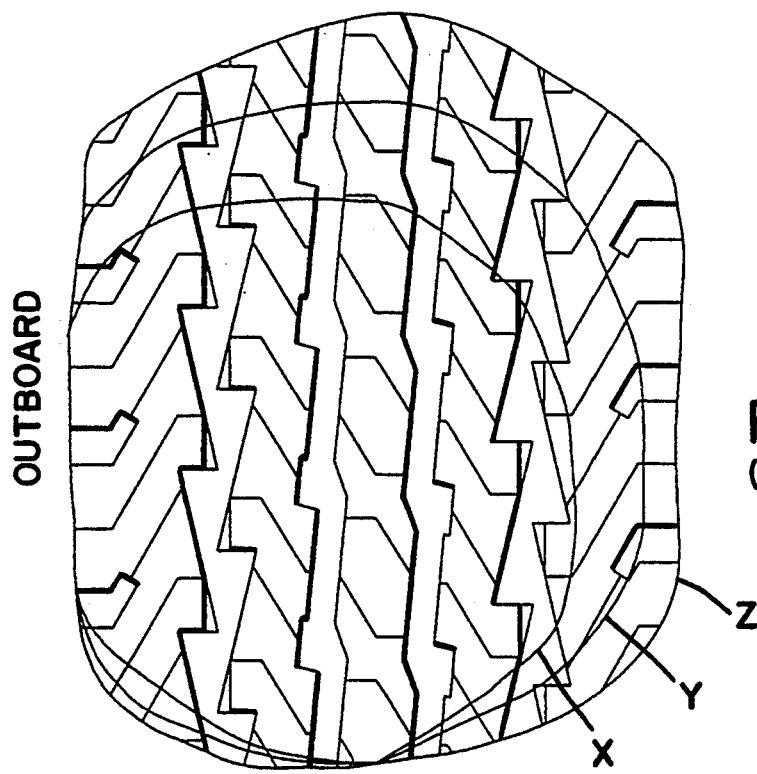
FIGS. 3A and 3B are schematic representations of footprints of a prior art tire.
Figure 3B:
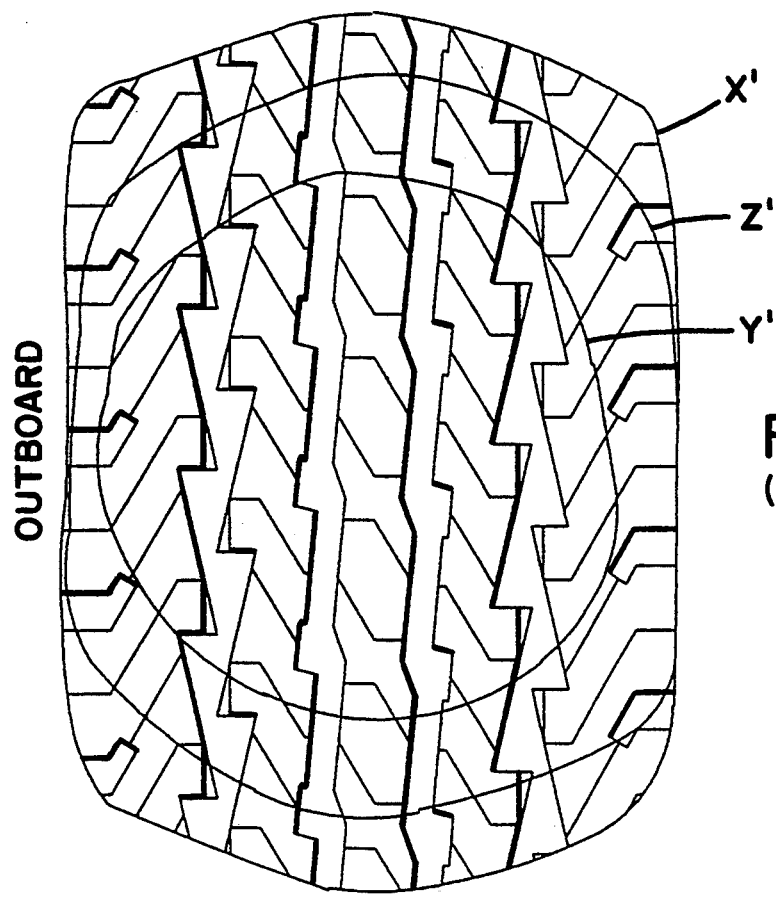

Referring next to FIGS. 3A and 3B there are shown schematic representations of the footprints of prior art tires which are mounted on the left side of a pick-up truck which has an independent suspension system for each wheel. FIG. 3A represents a tire mounted in the left front position and FIG. 3B represents a tire mounted in the left rear position. As is the case with most prior art tires the tread pattern shown in FIGS. 3A and 3B is symmetrical with respect to the equatorial plane of the tire.

The footprint areas enclosed by lines Y and Y' represent the tire footprints when an unloaded pick-up truck is parked. The footprint areas enclosed by lines Z and Z' represent the tire footprints when the pickup truck is loaded at its rated capacity with the load balanced between the front and rear wheels. The footprint areas enclosed by lines X and X' represent the tire footprints when the pickup truck is loaded at its rated capacity, but a majority of the load is upon the rear wheels. Large disparities in footprint sizes and shapes are also encountered during normal vehicle operation due to bouncing, cornering, rough roads, and so forth. It may therefore be surmised that the footprints of a tire will often be asymmetric with respect to its longitudinal axis even if the tread design of the tire itself is symmetrical with respect to the tire's equatorial plane. Experience has shown that a tire having a symmetrical tread design will normally have a higher rate of treadwear on the outboard shoulder than the inboard shoulder.

Figure 4A:
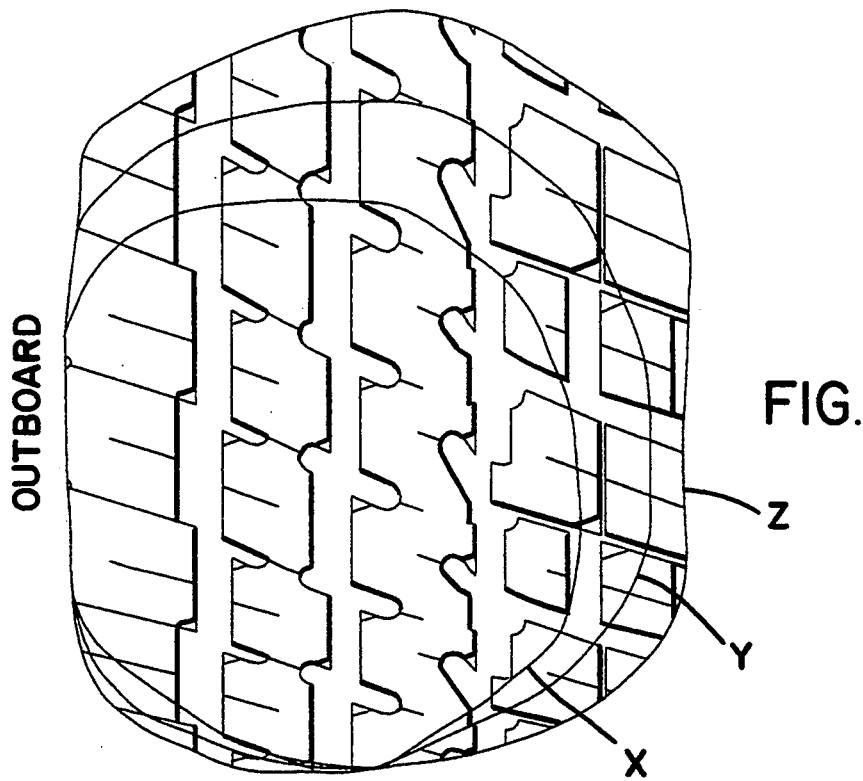
FIGS. 4A and 4B are schematic representations of footprints of a tire according to the invention.
Figure 4B:
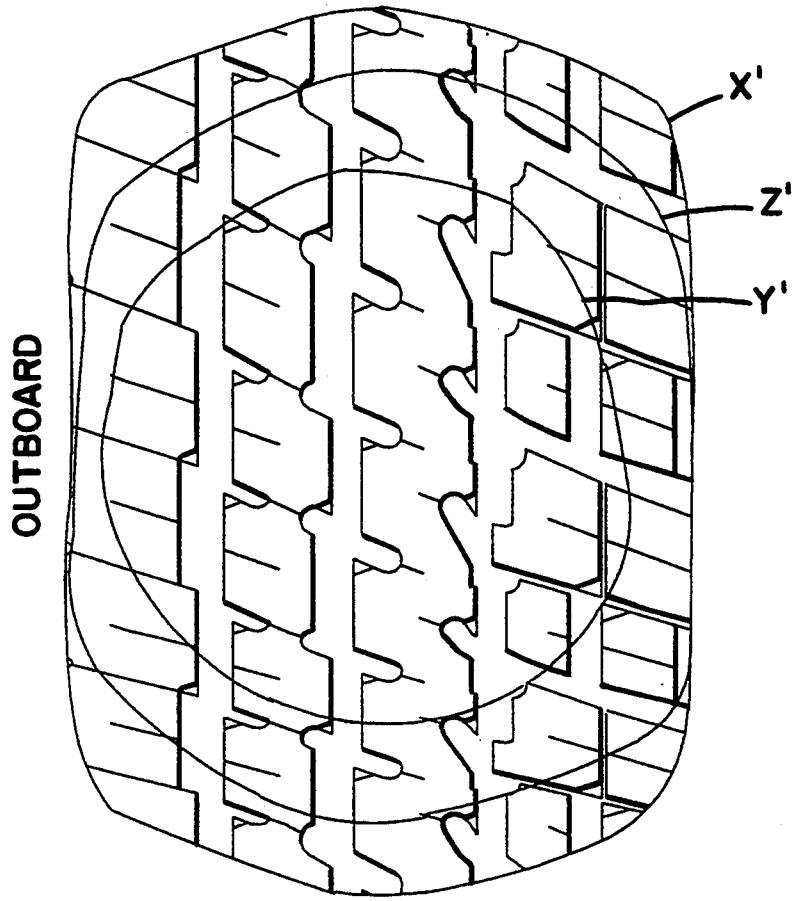

Referring next to FIGS. 4A and 4B there are shown schematic representations of the footprints of tires according to one of the preferred embodiments of the present invention mounted on the left side of a pick-up truck which has an independent suspension system for each wheel. FIG. 4A represents a tire mounted in the left front position and FIG. 4B represents a tire mounted in the left rear position. Unlike the prior art tires represented in FIGS. 3A and 3B tires according to the present invention have a tread pattern which is asymmetrical with respect to the equatorial plane of the tire. The footprint areas enclosed by lines Y and Y' represent the tire footprints when an unloaded pick-up truck is parked. The footprint areas enclosed by lines Z and Z' represent the tire footprints when the pick-up truck is loaded at its rated capacity with the load balanced between the front and rear wheels. The footprint areas enclosed by lines X and X' represent the tire footprints when the pick-up truck is loaded at its rated capacity, but a majority of the load is upon the rear wheels. Large disparities in footprint sizes and shapes are also encountered during normal vehicle operations due to bouncing, cornering, rough roads, and so forth. It is clear from FIGS. 3A and 3B that a tire according to the invention presents different ground contacting structures depending upon the operating conditions to which the tires are subjected.

With reference to FIG. 8 there is shown a cross-sectional view of a pneumatic tire 30 according to the present invention which has a carcass ply structure 31 reinforced by textile cords. It is understood that the structural features shown in FIG. 8 and described herein apply to each embodiment of the invention, including the most preferred embodiment. As used herein and in the claims "tire" is understood to mean either a newly manufactured tire or a tire which has been retreaded. As used herein and in the claims a "textile cord" is understood to mean either a monofilament structure or a multifilament structure. The carcass ply structure 31 comprises a sufficient number of plies of 33, 34 side-by-side cords to provide adequate load-bearing capacity in the tire in accordance with engineering standards which are well known in the tire art. In a preferred embodiment the carcass ply cords are polyester, and the cords are oriented at 75° to 90° with respect to the equatorial plane EP of the tire. As used herein and in the claims the "equatorial plane" is understood to mean a plane which is perpendicular to a tire's axis of rotation and passes through the center of its tread.

For instance, as a working example a tire having a size of 245/70R15, has two carcass plies 33,34 reinforced of polyester cords having a construction of 1000/3, and the cords of the radially innermost carcass ply 33 are oriented at 90° with respect to the equatorial plane EP, while the cords of the radially outermost carcass ply 34 are oriented at about 90° with respect to the equatorial plane EP.

Each ply 33, 34 of the carcass ply structure 31 has a pair of edge portions with each of the edge portions folded axially and radially outwardly about a substantially inextensible annular bead 35, 36. Preferably, a tire according to the invention is of the tubeless variety having a substantially air impermeable liner 37 disposed between the carcass ply structure and the inside of the tire.

A belt structure 38 reinforced by metallic cables is disposed radially outwardly of the carcass ply structure 31 and extends circumferentially thereabout. As used herein and in the claims a "metallic cable" is understood to mean either a monofilament or multifilament structure. In the working example the belt structure comprises two belt plies 39, 40 each of which comprises side-by-side metallic cables having a structure of 2+2×0.30 high tensile wire, and the cables of the radially innermost belt ply 39 are oriented at about 19° with respect to the equatorial plane EP while the cables of the radially outermost belt ply 40 are equally but oppositely oriented at about 19° with respect to the equatorial plane EP.

In preferred embodiments of the invention both the carcass ply structure 31 and the belt structure 38 are symmetrical with respect to the equatorial plane EP of the tire. However, it is within the scope of the present invention to employ a belt structure which is asymmetrical with respect to the equatorial plane, or have additional carcass ply structure components disposed in an asymmetrical manner with respect to the equatorial plane, in order to further reduce the differential in the rate of treadwear in opposed lateral portions of the tread of a tire.

An elastomeric tread portion 41 comprising a suitable elastomeric compound is disposed radially outwardly of both the carcass ply structure 31 and the belt structure 38 and extends circumferentially thereabout. In the working example a radially outermost layer of the tread portion comprises a single elastomeric substance. However, it is within the scope of the invention to provide a tire in which a first region of the tread adjacent to one shoulder comprises an elastomer having a different Shore A hardness from the elastomer comprising a second region of the tread adjacent to the other shoulder.

The tread portion has first 42 and second 43 axially opposed shoulders, with a sidewall portion 44, 45 extending radially inwardly from each shoulder to a bead portion 46, 47 of the tire. A tire according to the working example has a tread arc radius TAR, which is symmetrical with respect to the equatorial plane EP. As used herein and in the claims "tread arc radius" is understood to mean a radius of curvature having its center on the equatorial plane which is followed by the radially outer surfaces of the tread portion. In the working example, and in all of the preferred embodiments, the tread has a tread arc radius which is symmetrical with respect to the equatorial plane of the tire. However; it is within the scope of the present invention to provide a tire having a tread arc radius extending in a lateral direction which is asymmetrical with respect to the equatorial plane of the tire.

A tire according to the preferred embodiments which will be described hereafter in detail has an aspect ratio in the range of 0.60 to 0.85. Tires according to the working example have an aspect ratio of 0.70. As used herein and in the claims "aspect ratio" is understood to mean the ratio of section height to maximum section width of a tire. "Section height" refers to the radially measured distance (SH) from the nominal bead diameter of a tire to the maximum outside diameter of the tire. "Maximum section width" refers to the greatest axial distance (SW) between the axially outer surfaces of a tire's sidewalls exclusive of indicia or ornamentation on the sidewalls. As used herein and in the claims, the terms "radial" and "radially" are understood to refer to directions that are perpendicular to the axis of rotation of a tire, and the terms "lateral", "laterally", "axial" and "axially" are understood to refer to directions going from one sidewall of a tire towards the other sidewall of the tire.

Referring to FIGS. 5-7 there is shown of the tread portion 41 of a tire according to one of the preferred embodiments. In describing this embodiment those features which are generic to all of the preferred embodiments, including the most preferred embodiment, will be set forth, as well as those features which apply to this specific preferred embodiment.

In every embodiment the tread portion 41 of the tire has first and second axially opposed shoulders 42, 43. A tire according to the invention intended to be mounted with said first shoulder 42 inboard with respect to a vehicle at each of the wheel positions on the vehicle. In each embodiment the tread portion has at least two grooves 50, 51, 52, 53 therein which extend circumferentially about the tread. The circumferential grooves aid in the evacuation of water from the footprint and the lateral edges of the groove walls aid in lateral stability of the tire. In the embodiment shown in FIG. 7, the tread portion has first and second circumferential grooves 50, 51 disposed between the first shoulder 42 and the equatorial plane EP of the tire, and third and fourth circumferential grooves 52, 53 disposed between the equatorial plane EP and the second shoulder 43, with each said circumferential groove extending circumferentially about the tire. In this particular embodiment the axial width of each circumferential groove varies along the path of the groove to provide more edges for circumferential straight ahead traction and aids in reducing the noise generated by the tire.

In every embodiment the tread portion 41 has a series of grooves 55, 56 therein which extend from the first shoulder 42 in a diagonal direction at least partially across the tread portion. The diagonal grooves provide traction and acceleration in a variety of operating conditions such as paved roads, mud and snow, and off-the-road. (See FIG. 2, zones A and B). In the embodiment shown in FIG. 7 the series of grooves 55, 56 extends diagonally across the tread portion from the first shoulder 42 to the second circumferential groove 51.

In every embodiment one circumferentially extending groove 50 and the diagonally extending grooves 55, 56 cooperate to define a circumferentially extending array of block elements 57, 58 which is contiguous to the first shoulder 42. The block elements provide biting edges for traction. In the embodiment shown in FIG. 7 a first circumferentially extending array 60 of block elements 57, 58 is disposed between the first shoulder 42 and the first circumferential groove 50; a second circumferentially extending array 61 of block elements 62, 63 is disposed between the first and second circumferential grooves 50, 51; a first circumferentially extending rib 65 is disposed between the second and third circumferential grooves 51, 52; a second circumferentially extending rib 66 is disposed between the third and fourth circumferential grooves, 52, 53; and a third circumferentially extending rib 67 is disposed between the fourth circumferential groove 53 and the second shoulder 43.

In every embodiment the tread portion has three axial regions A, B, C each of which has an axial width equal to one-third of the tread width TW. As used herein and in the claims "tread width" is understood to mean the greatest axial distance across the tread measured from the footprint of a tire when the tire is mounted on its specified rim, inflated to its specified inflation pressure and subjected to its rated load for said inflation pressure. The specified rim and inflation pressure can be determined from any of the following sources: (a) indicia molded onto a sidewall of a tire by the tire manufacturer; (b) specification or sales literature available from the tire manufacturer; (c) the *YEARBOOK OF THE TIRE AND RIM ASSOCIATION* for the year in which the tire was manufactured; (d) the *YEARBOOK OF THE EUROPEAN TIRE AND RIM TECHNICAL ORGANIZATION* for the year in which the tire was manufactured. The first region A of the tread portion is adjacent to the first shoulder 42 and has a net-to-gross ratio in the range of 57% to 70%. The second region B of the tread portion is adjacent to the second shoulder 43. The third region C of the tread portion is axially interposed between the first and second regions A, B. In every embodiment the tread portion has a net-to-gross ratio in said second region B which is at least 110% of the net-to-gross ratio of the first region A and the net-to-gross ratio of the third region C is less than the net-to-gross ratio of the second region B but not less than 90% of the net-to-gross ratio of the first region A. Put another way the net-to-gross ratio in the third region C is at least 90% of the net-to-gross ratio of the first region A but less than the net-to-gross ratio of the second region B. Most preferably the net-to-gross ratio of the third region C is greater than the net-to-gross ratio of the first region A but less than the net-to-gross ratio of the second region B. As used herein and in the claims "net to gross ratio" is understood to mean the area of a tread that is actually in contact with the ground in a static footprint of a tire as a percentage of the total area of the footprint, or a region of a footprint, when the tire is mounted on its specified rim, inflated to its specified inflation pressure and subjected to its rated load at said inflation pressure. It is recognized in the tire art that the rate of treadwear will normally decrease as the net-to-gross ratio increases.

In the embodiment shown in FIG. 7, the net-to-gross ratio in the first region A is 70%, the net-to-gross ratio in the second region B is 77% and the net-to-gross ratio in the third region C is 65%.

In every embodiment the tread portion includes at least one structural feature which functions as a means for substantially equalizing the rate of treadwear in the first and second regions A, B of the tread portion. As used herein and in the claims the rate of treadwear in the first and second regions A, B of a tread portion is substantially equal if a tire which is mounted upon its specified rim and inflated to its specified inflation pressure and is not subjected to loads greater than its rated load, is used until it has no grooves remaining in either the first or second region of the tire, the depth of the grooves in the other said region is not greater than 10% of the depth of the same grooves when the tread is new. In every embodiment the tread portion has a means for substantially equalizing the rate of treadwear in the first and second regions A, B of the tread portion comprising at least one structural feature selected from the group consisting of: (a) chamfering the edges of block elements at a variety of angles in order to provide rigidity of varying degrees as the tread portion wears and also changes the net-to-gross ratio as the tread portion wears; (b) orienting the diagonally extending grooves at a variety of angles along the groove paths with respect to the equatorial plane of the tire so thereby imparting different rates of wear to different block elements which are bordered by a groove; (c) providing each said diagonally extending groove with a variety of widths along its path thereby affecting the net-to-gross ratio in a variety of locations thereby giving different rates of wear for different block elements bordered by the groove; (d) providing each said diagonally extending groove with a variety of depths along its path deeper grooves result in higher groove walls (block element walls) and faster wear rates, therefore the variations in groove depth allows control of wear rates along a groove path. It is understood that while at least one of these structural features is incorporated in any tire according to the invention, more than one of these structural features, and other structural features which will be described hereinafter may be employed in a tire according to the invention.

For example, in the embodiment illustrated in FIG. 7, the means for substantially equalizing the rate of treadwear in the first and second regions A, B of the tread portion includes the following structural features. The edges of the block elements 57, 58, 62, 63 in the arrays 60, 61 are chamfered at a variety of angles. The diagonally extending grooves 55, 56 which extend from the first shoulder are oriented at a variety of angles with respect to the equatorial plane EP of the tire. Sipes 68, 69 traversing the second and third circumferentially extending ribs 66, 67, have depths such that the depth of the sipes 68 in the second circumferentially extending rib 66 differ from the depth of the sipes 69 in the third circumferentially extending rib 67, all of the sipes 68, 69 having a lesser depth than the depth of the third and fourth circumferential grooves 52, 53. As used herein and in the claims "sipes" are understood to mean very narrow grooves that do not remain open in the footprint of a tire. It is believed that at least one of these structural features, and preferably more than one of these features, should be employed in this embodiment.

Tires according to the working example have tread portions wherein the radially outer part of the tread comprises a single elastomeric substance having a Shore A hardness of about 68. However; the first region of the tread portion may comprise an elastomer having a different Shore A hardness from the elastomer comprising the second region of the tread portion.

Another structural feature which may be employed in the tread portion of a tire according to the invention relates to variations in the widths of the radially outermost surfaces of the block elements 57, 58 in the circumferentially extending array 60 of block elements which is contiguous to the first shoulder 42. For example, in the embodiment illustrated in FIGS. 5-8 the axially outermost extent of the radially outermost surface of each block element 57 of the first circumferentially extending array of block elements differs from that of the block elements 58 which are circumferentially next adjacent thereto. This feature is especially desirable if the tire will be used in off-the-road or muddy environments because it provides extra traction at the shoulder 42 and aids in expulsion of mud from a tire footprint. This feature, as best shown in FIG. 8, results in the tread portion having a greater width $D_2$ on one side of the equatorial plane EP than the width $D_1$ on the other side of the equatorial plane.

Preferably, in each embodiment the contour of the first shoulder 42 differs from the contour of the second shoulder 43 as viewed in a cross-section of the tire taken in a plane that contains the axis of rotation of the tire. This feature is best shown in FIG. 8. Most preferably, the first shoulder 42 has a contour that is conical and the second shoulder 43 has a contour that is arcuate. The arcuate contour which should be located on the outboard side with respect to a vehicle aids in vehicle handling because during turning or curving the footprint width and contact area on the outboard side of the tire increases due to load transfer. The inboard conical shoulder 42 further enhances biting grip and traction against less stable surfaces such as mud, snow and off-the-road surfaces. For example, in the embodiment illustrated in FIGS. 5-9 the first shoulder 42 has axially outermost surfaces which are conical and the second shoulder 43 has an axially outermost surface, or surfaces, which is/are arcuate. It is most preferred that the second shoulder 43 has a series of notches 70 therein such that the second shoulder has a multiplicity of axially outer surfaces, each of which has an arcuate contour. Structural details of the shoulders are shown in detail in FIGS. 9A and 9B. The notches 70 in the second (arcuate) shoulder will provide some traction in snow and mud without reducing the stability of any rib contiguous with the second shoulder.

Referring next to FIG. 10 there is shown a second embodiment of the invention wherein the tread portion 75 of the tire has first, second and third circumferential grooves 76, 77, 78 therein which extend circumferentially about the tread portion. The first circumferential groove 76 is the nearest circumferential groove to the first shoulder 79 of the tire. The second circumferential groove 77 is the nearest circumferential groove to the second shoulder 80 of the tire. The third circumferential groove 78 is axially interposed between the other two circumferential grooves 76, 77. A first circumferentially continuous rib 81 is disposed between the second shoulder 80 of the tire and the nearest circumferential groove 72, which is referred to herein and in the claims as the second circumferential groove. A second circumferentially continuous rib 82 is disposed between the second and third circumferential grooves 77, 78. A series of diagonally extending grooves 83 in the tread portion originate at the first shoulder 79 and end in the second circumferentially extending rib 82, such that one circumferentially extending array 84 of block elements 85, 86 is disposed between the first and third circumferentially extending grooves 76, 78 and a second circumferentially extending array 87 of block elements 88, 89 is disposed between the first shoulder 79 and the nearest circumferential groove 76, which is referred to herein and in the claims as the first circumferential groove. It is believed to be an important feature of this embodiment that the axial widths of the first and second ribs 81, 82 and the first and second circumferentially extending arrays 84, 87 of block elements are all different from one another. In this embodiment the tread portion has a net-to-gross ratio in the second region B which is at least 120% of the net-to-gross ratio in the first region A and the net-to-gross ratio of the third region C is greater than the net-to-gross ratio of the first region A. For example, in a tire of size 245/70R15 the net-to-gross ratio in the first region A was 57%, the net-to-gross ratio in the second region B was 76%, and the net-to-gross ratio in the third region C was 71%.

In the embodiment illustrated in FIG. 10 the means for substantially equalizing the rate of treadwear in the first and second regions A, B of the tread portion includes the following structural features. At least some of the block elements 85, 86 in the first and second circumferentially extending arrays 84, 87 of block elements have edges that are chamfered at a variety of angles. The leading and trailing edges of the block elements 85, 86, 88, 89 of the first and second circumferentially extending arrays 84, 87 of block elements are oriented at a variety of angles with respect to the equatorial plane EP of the tire. The width of each of the diagonally extending grooves 83 varies along the path of the groove. It is believed that at least one of these structural features, and preferably more than one of these features, should be employed in this embodiment. Other structural features, such as a variety of shoulder contours, which have already been described may be employed in this embodiment also.

Referring next to FIG. 11, there is shown a third embodiment of the invention wherein the tread portion 100 has a first circumferential groove 101 which follows a zig-zag path and extends circumferentially about the tread is disposed not more than 25% of the tread width TW away from the first shoulder 102. A second circumferential groove 103 which also follows a zig-zag path and extends circumferentially about the tread portion is disposed not more than 10% of the tread width TW away from the equatorial plane EP and is interposed between the equatorial plane and the second shoulder 104. A series of grooves 105 extends diagonally across the tread portion from the first shoulder 102 to the second circumferential groove 103. A circumferentially extending array 106 of pairs of laterally adjacent block elements 107, 108; 111, 112 is disposed between the first shoulder 102 and the second circumferential groove 103. A circumferentially extending rib 109 is disposed between the second circumferential groove 103 and the second shoulder 104. The tread portion has a net-togross ratio in the second region B which is at least 130% of the net-to-gross ratio in the first region A and the net-to-gross ratio of the third region C is greater than the net-to-gross ratio of the first region A but less than the net-to-gross ratio of the second region B. For example, in a tire of size 245/70R15 the net-to-gross ratio in the first region A was 64%, the net-to-gross ratio in the second region B was 88%, and the net-to-gross ratio in the third region C was 67%.

In the embodiment illustrated in FIG. 11 the means for substantially equalizing the rate of treadwear in the first and second regions A, B of the tread portion includes the following structural features. The diagonally extending grooves 105 follow curved paths such that the leading and trailing edges of the block elements 107, 108; 111, 112 are curved. The blocks 107, 108; 111, 112 in each pair of laterally next adjacent block elements each have an axial extent that differs from the axial extent of the other block element of the same pair. The axial extent of each block of the circumferentially extending array 106 of block elements differs from the axial extents of the blocks with are circumferentially next adjacent thereto. The circumferentially extending rib 109 is traversed by grooves 110, 113 which follow curved paths and have depths which are less than the depth of the second circumferential groove 103. It is believed that at least one of these structural features, and preferably more than one of these features, should be employed in this embodiment. Other structural features, such as a variety of shoulder contours, which have already been described may be employed in this embodiment also.

Referring next to FIG. 12, there is shown a most preferred embodiment of the invention wherein the tread portion 115 has four circumferential grooves 116, 117, 118, 119 therein which extend circumferentially about the tread portion and follow zig-zag paths. As used herein and in the claims "zig-zag" is understood to mean a line, path or groove comprising straight segments arranged end-to-end and oriented at angles of other than 0° with respect to one another. A series of diagonally extending grooves 120 in the tread portion extend from the first shoulder 121 to the second shoulder 122 and follow zig-zag paths. The circumferential grooves 116, 117, 118, 119 and diagonally extending grooves 120 and the shoulders 121, 122 cooperate to define five circumferentially extending arrays 123, 124, 125, 126, 127 of block elements, with the axial widths of said arrays all being different from one another. In this most preferred embodiment the tread portion has a net-to-gross ratio in the second region B which is at least 120% of the net-to-gross ratio in the first region A, and the net-to-gross of the third region C is greater than the net-to-gross ratio of the first region A but less than the net-to-gross ratio of the second region B. For example, in a tire of size 245/70R15 the net-to-gross ratio in the first region A was 57%, net-to-gross ratio in the second region B was 77% and the net-to-gross ratio in the third region was 72%.

In the most preferred embodiment illustrated in FIG. 12, the means for substantially equalizing the rate of treadwear in the first and second regions A, B of the tread portion includes the following structural features. At least some of the block elements of some of said five circumferentially extending arrays 123, 124, 125, 126, 127 of block elements have edges which are chamfered at a variety of angles. The width of each diagonally extending groove 120 progressively decreases along the path of the groove from its greatest width at the first shoulder 121 to its least width at the second shoulder 172. The circumferential grooves 116, 117, 118, 119 have progressively narrower widths as a function of the axial distance of a circumferential groove from the first shoulder 121. The axial width of each circumferentially extending array 123, 124, 125, 126, 127 of block elements is progressively less as a function of the axial distance of the array from the first shoulder 121. Next adjacent segments of the zig-zag path of each diagonally extending groove 120 have a variety of lengths. The depth of each diagonally extending groove 120 varies along the path of the groove. It is believed that at least one of these structural features, and preferably more than one of these features, should be employed in this most preferred embodiment. Other structural features, such as a variety of shoulder contours, which have already been described may be employed in this most preferred embodiment also.

While certain representative embodiments and details have been described for the purpose of illustrating the invention it will be apparent to those skilled in the art that various changes and modifications may be made therein without departing from the spirit or scope of the invention.

We claim:

1. A pneumatic tire comprising a radial ply carcass structure and a belt structure with an elastomeric tread portion extending circumferentially about the carcass structure and belt structure, said tread portion having first and second axially opposed shoulders, said tread portion having at least two grooves therein which extend circumferentially thereabout and a series of grooves therein which extend from said first shoulder diagonally at least partially across the tread portion, one said circumferentially extending groove and said diagonally extending grooves cooperating to define a circumferentially extending array of block elements which is contiguous to said first shoulder, said tread portion having three axial regions each of which has an axial width equal to one-third of the tread width, said first region having a net-to-gross ratio in the range of 57% to 70% and being adjacent to said first shoulder, said second region being adjacent to said second shoulder, and said third region being axially interposed between said first and second regions, the tread portion having a net-to-gross ratio in said second region which is at least 110% of the net-to-gross ratio in said first region and the net-to-gross ratio of said third region being at least 90% of the net-to-gross ratio of the first region but less than the net-to-gross ratio of the second region, and
wherein each block element of the circumferentially extending array of block elements contiguous to said first shoulder has a radially outermost surface, the axially outermost extent of the radially outermost surface of each block element of said array differing from that of the block elements circumferentially next adjacent thereto and said first shoulder has axially outermost surfaces which are conical and said second shoulder has an axially outermost surface which is arcuate.

2. A pneumatic tire according to claim 1 wherein a circumferentially extending rib is contiguous to said second shoulder.

3. A pneumatic tire according to claim 2 wherein said second shoulder has a series of notches therein.

4. A pneumatic tire according to any one of claims 2, or 3 wherein the belt structure is asymmetrical with respect to the equatorial plane of the tire.

5. A pneumatic tire according to any one of the claims 1, 2, or 3 wherein the first region of the tread portion comprises an elastomer having a different Shore A hardness than the Shore A hardness of the elastomer comprising the second region of the tread.

6. A pneumatic tire comprising a radial ply carcass structure reinforced by textile cords and a belt structure reinforced by metallic cables with an elastomeric tread portion extending circumferentially about the carcass structure and belt structure, said tread portion having first and second axially opposed shoulders, said tread portion having first and second circumferential grooves disposed between said first shoulder and the equatorial plane of the tire and third and fourth circumferential grooves disposed between the equatorial plane and second said shoulder, each said circumferential groove extending circumferentially about the tire, the axial width of each circumferential groove varying along the path of the groove, a series of grooves extending diagonally across the tread portion from said first shoulder to said second circumferential groove, a first circumferentially extending array of block elements being disposed between said first shoulder and said first circumferential groove, a second circumferentially extending array of block elements being disposed between said first and second circumferential grooves, a first curcumferentially extending rib being disposed between said second and third circumferential groves, a second circumferentially extending rib being disposed between said third and fourth circumferential grooves, a third circumferentially extending rib being disposed between said fourth circumferential groove and said second shoulder, said tread portion having three axial regions each of which has an axial width equal to one-third of the tread width, said first region having a net-to-gross ratio in the range of 57% to 70% and being adjacent to said first shoulder, said second region being adjacent to said second shoulder, and said third region being axially interposed between said first and second regions, the tread portion having a net-to-gross ratio in said second region which is at least 110% of the net-to-gross ratio in said first region and the net-to-gross ratio of said third region being at least 90% of the net-to-gross ratio of the first region but less than the net-to-gross ratio of the second region, and wherein each block element of said first circumferentially extending array of block elements has a radially outermost surface, the axially outermost extent of the radially outermost surface of each block element of said array differing from that of the block elements circumferentially next adjacent thereto and said first shoulder has axially outermost surfaces which are conical and said second shoulder has an axially outermost surface which is arcuate.

7. A pneumatic tire according to claim 6 wherein said second shoulder has a series of notches therein.

8. A pneumatic tire according to any one of claims 6 or 7 wherein the belt structure asymmetrical with respect to the equatorial plane of the tire.

* * * * *